INVENTOR.
GEORGE G. BRANNING
BY L. Lee Humphries
ATTORNEY

May 9, 1967  G. G. BRANNING  3,318,611
MOVING VAN

Original Filed Jan. 23, 1961  3 Sheets-Sheet 2

INVENTOR.
GEORGE G. BRANNING
BY *L. Lee Humphries*
ATTORNEY

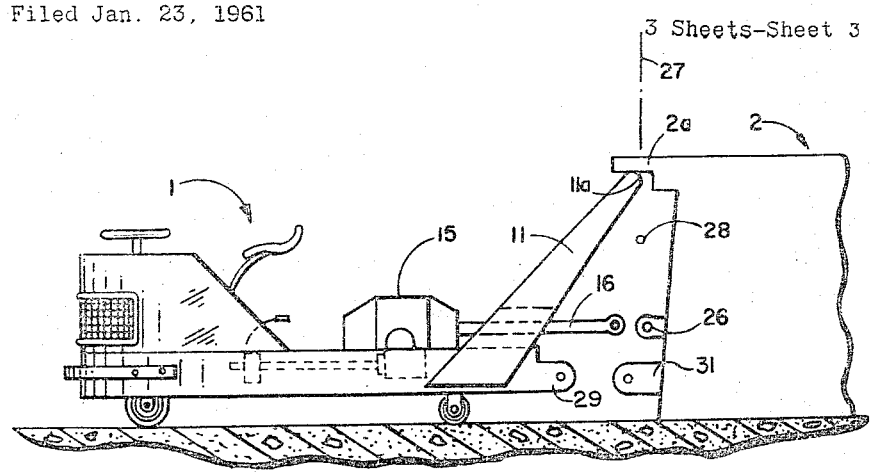
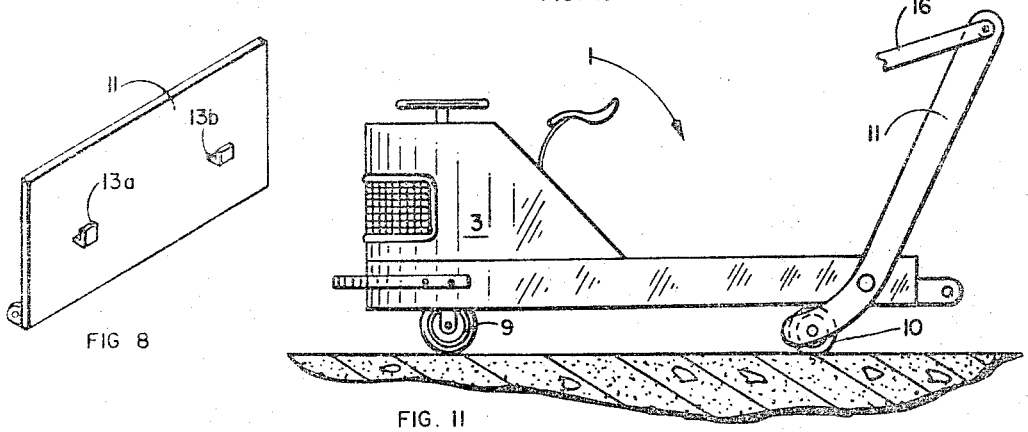
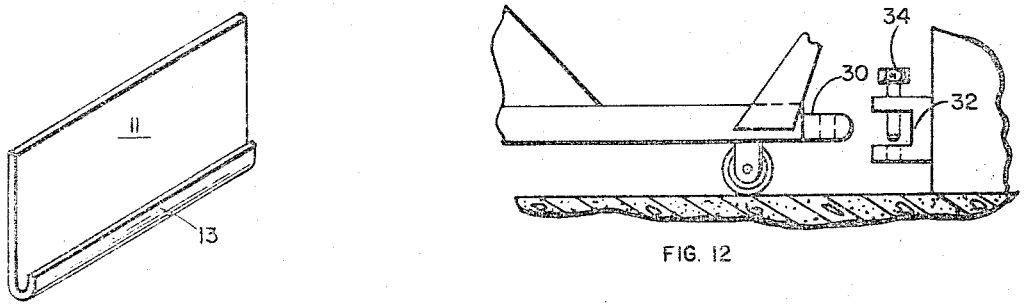
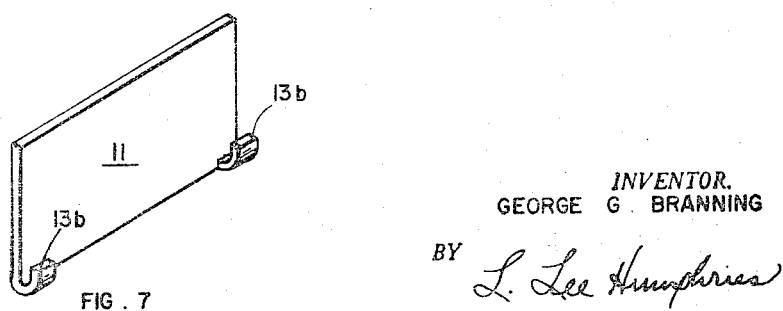

United States Patent Office 3,318,611
Patented May 9, 1967

3,318,611
MOVING VAN
George G. Branning, San Pedro, Calif., assignor of one-third to Richard A. Espinoza and one-third to L. Lee Humphries
Original application Jan. 23, 1961, Ser. No. 84,144, now Patent No. 3,207,253, dated Sept. 21, 1965. Divided and this application June 7, 1965, Ser. No. 494,995
4 Claims. (Cl. 280—34)

This case is a division of Serial No. 84,144, filed January 23, 1961, entitled "Moving Van," and now issued as Patent No. 3,207,253.

This invention relates to a freight moving van and more particularly to a new and useful power cart in combination with a freight container.

Freight handling constitutes a large portion of the expense in the distribution of goods. Many schemes to increase the amount of freight which can be handled add greatly to the weight of the goods by requiring, for example, complete trailer systems or power systems in each freight container. The piggy-back system of forwarding freight introduces increased ease of moving freight, reduced handling, flexibility, and so on, but requires a great deal of "dead weight" to be transported and returned.

Freight must be easy to move, easy to lift and easy to set down. Any system for moving freight should be a universal type which can be operable in all types of ships, railroad freight cars, cargo aircraft, and automotive trucks. A moving van which allows one man to operate substantially without aid is preferable. Further, it is desirable to provide an operating device capable of lifting and transporting heavy loads, up to several tons, possibly. A moving van should be of simple, reliable, and rugged construction. Complex equipment which requires expensive initial investment and expensive maintenance cost would, of course, be unsuitable.

Not only must the moving van provide ease of lifting, transporting and setting down of large amounts of freight, but it should be so devised that it can turn corners easily with the freight in a stable position at all times. In addition, the moving van should be so devised that it does not get "hung up" on high centers. Also, it must move easily up or down inclines and ramps and across transitions and "breaks" or where such inclines and ramps begin and end.

Inasmuch as this invention utilizes a relatively simple, uniform freight container, great saving may be made in initial equipping. A small number of power carts may handle many containers and may even be carried along with the ship and be used, to the extent permitted, in ports where such equipment does not exist.

The power cart must, of course, be mobile without the freight container and therein lies a problem. If a power cart must be stable and mobile by itself, it in all likelihood, has two axles and corresponding wheels. If the freight container has even as few as one axle (and wheel or wheels), there are then three axles having wheels on the ground. Such combination does not turn corners easily, unless an articulate coupling is devised such as is presently known and used by the road tractor and semi-trailer. These combinations require differential gearing in the rear road tractor axle which permits the wheel on the "outside" of a turn to rotate more than the wheel on the "inside" of the turn. Also, special couplings are required which allow freedom of motion vertically between the tractor and semi-trailer, as for example, when the tractor goes across transition areas leading to inclines, mentioned before. Such road tractors utilize heavy horizontal plates pivoted about a horizontal axis to meet such problem.

The device of the invention has simplified the above-discussed aspects of turning corners, crossing incline areas and provides a structure of greater simplicity than any presently known or used. The freight is at all times under stable control, and never assumes an unstable position even when turning corners. No demands of strength are made of the operator and the power cart is utilized to its full mechanical advantage.

Further, in the device of the invention, no counterweights are necessary; therefore, the freight handling device of this invention is considerably lighter than previously used freight handlers.

It is therefore an object of this invention to provide a moving van of improved design.

Another object of the invention is to provide a lighter moving van which is capable of lifting, transporting, and depositing heavy loads.

Still another object of this invention is to provide a moving van capable of turning corners with ease.

A still further object of this invention is to provide a moving van capable of passing over "high centers."

A further object of this invention is to provide a rugged moving van which is transportable from place to place.

Another object of this invention is to provide a moving van which is easily built, yet capable of handling great weights.

Further objects and features will be apparent upon reference to the drawings which are by way of illustration of the invention and not by way of limitation.

FIG. 6 is an illustration of frame, or plate, 11 showing a lower rolled edge;

FIG. 7 is an illustration of frame, or plate, 11 showing only two load engaging areas;

FIG. 8 is an illustration of frame, or plate, 11 showing intermediate grips;

FIG. 10 is another important embodiment of the invention wherein the frame is fixed and is held apart from the front face of the container;

FIG. 11 is still another embodiment of the device in which the frame is pivotal and carries the rear rolling means of the cart; and FIG. 12 shows a coupling hitch useful in the embodiments of the invention.

Figure 1:
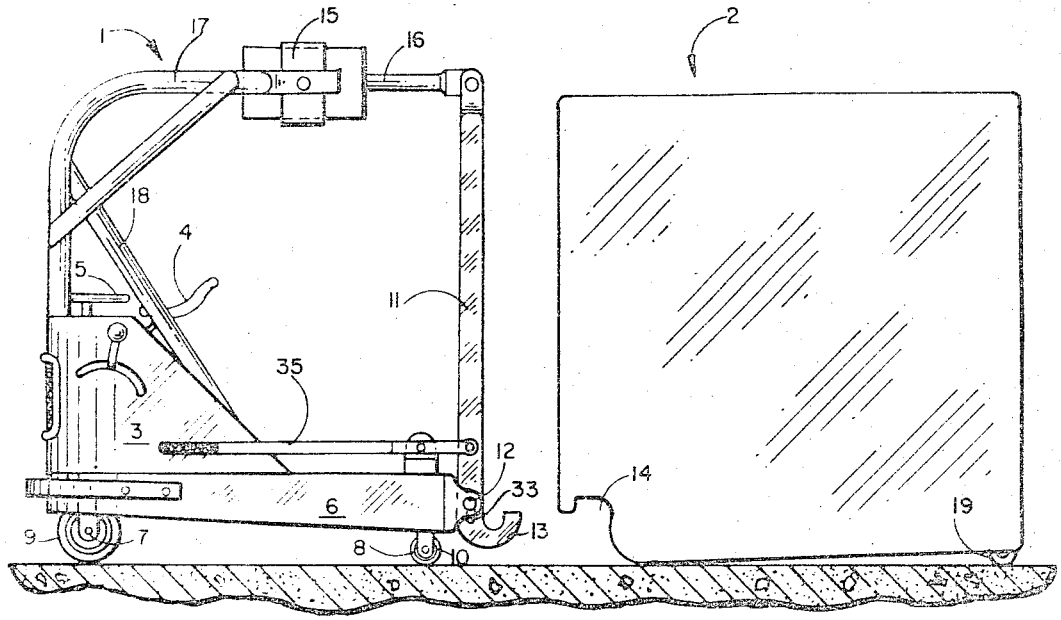
FIG. 1 is a side view of one embodiment of the invention showing the power cart disengaged from the freight container.

In the drawings, FIG. 1 shows a power cart 1 indicated generally which is adapted to engage and lift freight container 2. The power cart is powered by an engine or motor in housing 3 and controlled by an operator who may sit, utilizing seat 4, or stand. Directional control, or steering, is obtained by steering wheel 5. The cart comprises a base 6 which is mounted on front and rear axles at 7 and 8. Double or single wheels or cylinders 9 and 10 are mounted on the axles to provide mobility to the power cart when unattached to the freight container. Steering wheel 5 controls the front wheel 9, or wheels, for directional control.

Mounted at the rear of base 6 is an upright butting frame 11 (illustrated as being a plate although it may be understood that a rigid frame would suffice equally well). Frame 11 is rotatable with respect to the base 6, which rotation is obtained by means of a hinge or pin mount 12 or some other suitable construction. At or near the lower extremity of frame 11 is means 13 for engaging the container 2. This is shown as being an upwardly curving hook although any positive, secure engagement means is suitable such as a grip, latch, or other means of sufficient strength to firmly grip and hold on to container 2, at or near its front. In FIG. 1, container 2 is illustrated as having a recess 14 adapted to receive hook 13 providing secure attachment between frame 11 and the front face of container 2. It is noted that plate 11 is flat against the front face of container 2 (when hook 13 is engaged in recess 14) and frame 11 and cart 1 cannot rotate about a vertical axis with respect to container 2. Thus, power cart 1 and container 2 are one moving body in going around corners (when attached together).

Plate or frame 11, when its hook 13 is engaged in recess 14, is caused to rotate on its pin mount 12, relative to base 6 by power supply device 15 shown as a hydraulic cylinder having a piston rod 16 connected to the upper end of plate 11. Cylinder 15 which may of course be any suitable power providing device such as a hydraulic motor, electric motor, or gear drive, is mounted on a brace 17 extending upwardly and backwardly on the power cart. Cylinder 15 is mounted to allow slight rotation on brace 17. Brace 17 is strengthened by angle brace 18 extending down to base 6.

As power device 15 causes piston rod 16 to extend under hydraulic control for example (not shown), plate 11 rotates slightly and the wheels 10 are lifted from the ground and the container is rocked back on its rear rolling means 19. It may be desirable to place a slot 33 in frame 11 to allow for sliding frame 11 upwardly after hook 13 is located directly below recess 14 so as to be engaged firmly in the recess. A foot operated lever 35 may be used to so lift plate 11 at the time of engagement just for the moment until actuator 15 commences to operate. When the frame 11 is firmly engaged and actuator 15 commences extension of rod 16, no further lift of the frame 11 is required. By judicious choice of hook length and recess depth such lift lever may be dispensed with. The whole freight load and power cart are then riding on the front rolling means 9 and the rear rolling means 19. Thus, corners can be easily negotiated since there are no third wheels located in the center which are caused to slide when turns are made. Further, the whole moving van has a high center for easily passing over inclines, ramps and transition areas leading to such areas. No instability is experienced inasmuch as the power cart and the freight container have no permitted motion relative to each other about the vertical axis at their coupling. In addition, it can be readily seen that no counterbalancing weights are necessary.

Figure 2:
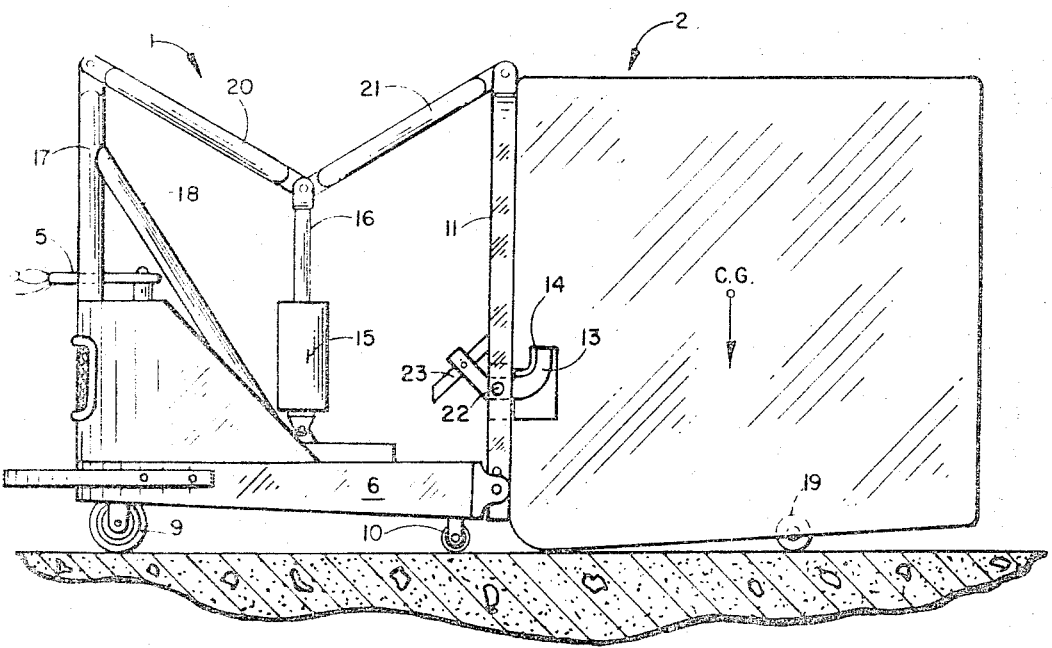
FIG. 2 is an alternate construction showing the power supplying device in different location, and showing the power cart in engaged position with the container.

FIG. 2 illustrates an embodiment of the invention in which the rolling means 19 of container 2 is located much closer to being under the center of gravity of the freight container (and its load) and is therefore more easily rocked back into rolling position. Also modified is the hooking means on plate 11. The hook 13 is pivotally mounted by pin 22 and is held locked in place by locking latch 23 which abuts against plate 11. In this embodiment, plate 11 is moved by a linkage comprised of arm 20 connected to brace 17 and arm 21 connected to plate 11. Both arms are connected together and driven by the extension or retraction of piston rod 16. Power source, or actuator 15, is shown in this embodiment as being located on the base element 6 and derives tremendous mechanical advantage by operating on the linkage 20 and 21. This embodiment, as in the case of the embodiment shown in FIG. 3, lifts the front end of the container off the ground. At the same time, the rear wheels 10 of the power cart leave the ground and the moving van is mobile on the front axle of the power cart and the axle of the freight container. FIG. 6 illustrates hook 13 as extending possibly all the way across the front of container 2 but it is clear that it may be actually constructed to hook as a single hook or as two or more hooks at the front or near the front, or on the sides, for example, as referred to later in connection with FIGS. 4 and 7. Also, in FIG. 2 is shown the arrangement wherein the operator stands on the front of the power cart and the steering means 5 comprises a handle bar which extends forward. Controls for actuator 15, as well as throttle and brake controls may be incorporated conveniently at or near the handlebar steering means 5.

Figure 3:
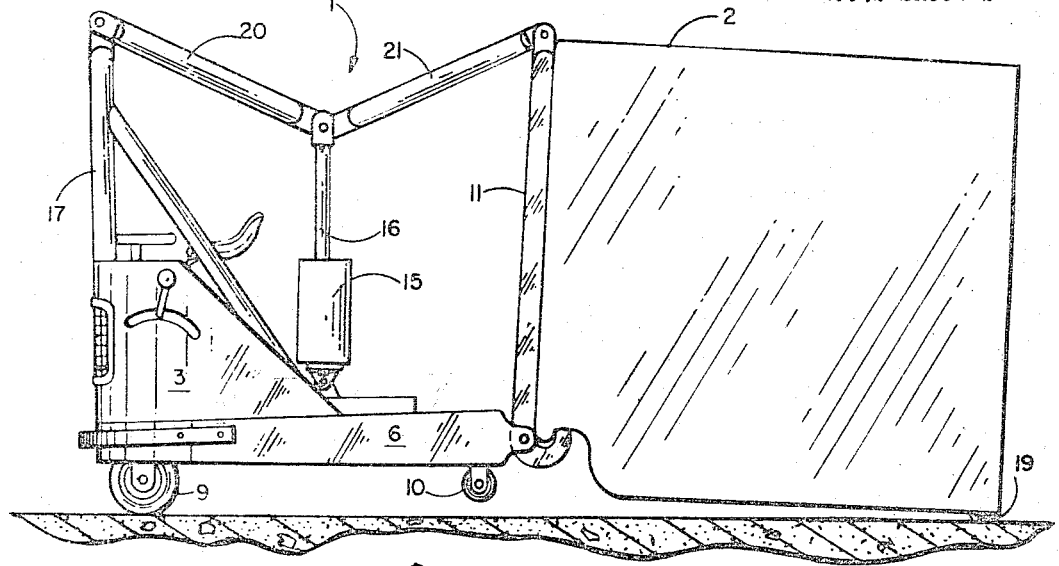
FIG. 3 illustrates the power cart engaged with the container ready for transporting.

FIG. 3 illustrates how the rear axle (and wheels) of the power cart are lifted from the ground in operation to provide a fully-maneuverable, easily-turning moving van. The power cart and freight container are firmly connected as one body, with the frame 11 firmly against the freight container. No relative motion exists between the frame 11 and the container 2 in any maneuver. Container 2 is riding on its rear wheels or cylinder 19 and power cart 1 is riding on its front wheels 9. Essentially, each embodiment would assume this arrangement for mobility. Whether the structure used is any of the other embodiments, they are all designed to assume the operating mode shown in FIG. 3, as to lifting container 2 onto its back wheel and cart 1 onto its front wheel or wheels.

Figure 4:
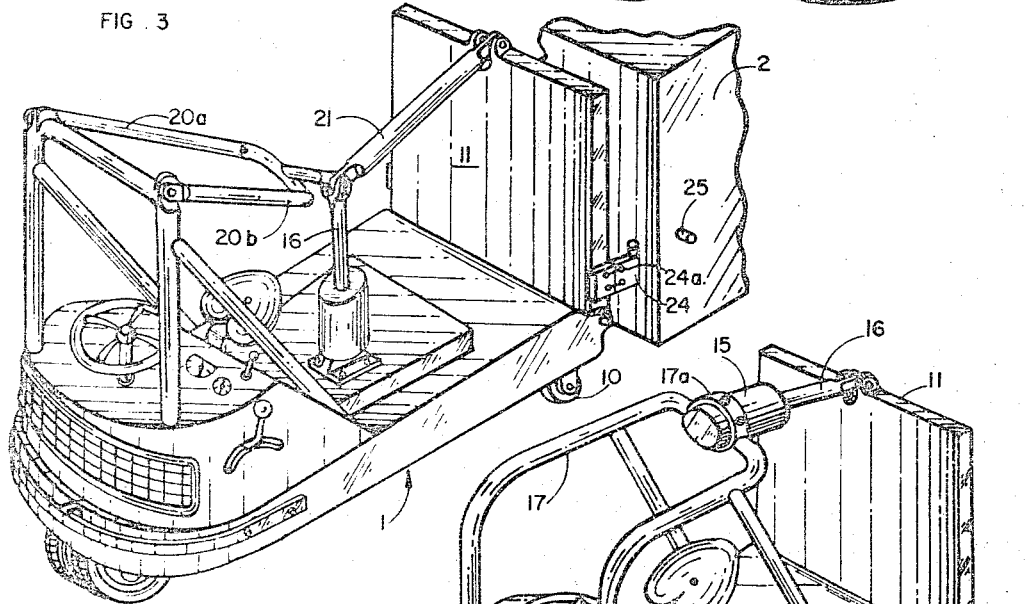
FIG. 4 shows the power cart of FIG. 2 isometrically.

FIG. 4 is an isometric illustration of the power cart 1 showing modified detail. Arm 20 is illustrated as being a yoke of two arms 20a and 20b. Frame 11, instead of being rolled or curved at its lower extremity has two side grips (one shown at 24) which may be hinged at 24a to be swung out of the way or into position for engagement with pin or rod 25 on container 2. After hook 24 (and its mate on the opposite side) are swung into engagement with pin 25 (and its mate on the opposite side) extension of rod 16 will force the top end of frame 11 rearwardly and container 2 will be rocked back on its roller means and wheel 10 of power cart 1 will be lifted from the ground.

Figure 5:
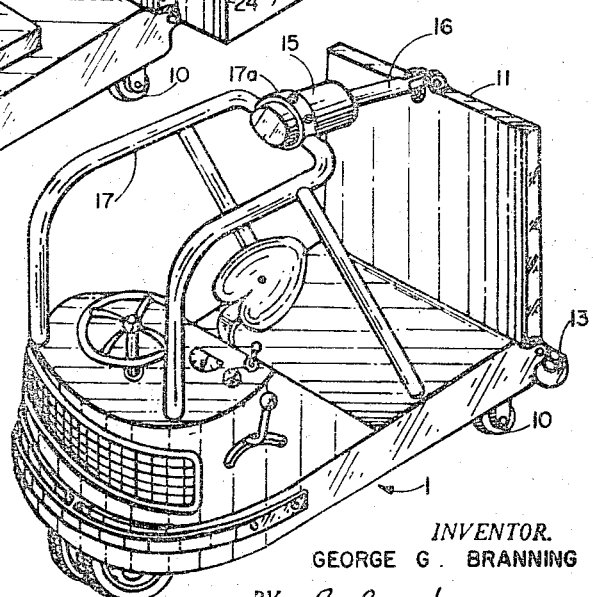
FIG. 5 shows another power cart in isometric illustration.

In FIG. 5 is illustrated another embodiment of the invention. Cylinder 15 is horizontally disposed on brace 17a which is part of structural brace 17. Hook 13 may be a single upturned edge extending all the way across frame 11 as shown in FIG. 6, or it may comprise merely two upturned areas 13a and 13b, as shown in FIG. 7 (or even more upturned areas). FIG. 8 illustrates hooks 13a and 13b located in the intermediate area of frame 11. They must of necessity be designed to have great strength by reason of the large forces placed on them when the load is being lifted, transported and set down.

It is noted in these embodiments the power cart lifts its own rearward wheels from the ground as well as the front portion of the freight container. Further, the freight container is firmly engaged with no permitted motion between power cart and container about a vertical axis as occurs in many prior freight handling systems.

Figure 9:
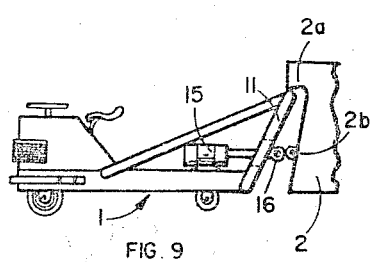
FIG. 9 is an illustration of another important embodiment of the invention wherein the frame is fixed.

FIG. 9 illustrates another embodiment in which rear frame 11 engages an overhang 2a on container 2. Power cylinder 15 has a rod 16 which engages the container at 2b. Rod 16 retracts when engaged and the rear of the cart and the front end of the container move upwardly into the mobile position shown in FIG. 3. It may be appreciated that the overhang is not necessary at all. A slight curvature of frame 11 may, in addition, aid in the lifting operation. Cylinder 15, shown attached to cart 1, may, of course, be detachable after its operation is complete if some engaging means (such as 13 and 14, FIG. 2) are utilized to hold the container and frame together.

FIG. 10 is another illustration in which the frame 11 of cart 1 is held apart from the front face of container 2. This may be desirable in instances wherein the container is not strong enough along its face to receive the pressures which might otherwise be involved. Power source 15 may be seen to be a power take-off from the motor, if desirable, just so long as connecting rod 16 is empowered to pull the cart and container toward each other. When relatively near, if it is desired to relieve the strain placed on connecting rod 16 a coupling means comprised of couple 29 on cart 1 and couple 31 on container 2 may be connected as, for example, by a tow bar pushed through their eyes when they are aligned. The cart and van would then be coupled together strongly for mobile operation in accordance with the concept of the invention. It is clear other tow bar, coupling or gripping means may be constructed to hold the cart and container in this position.

For example, the pin 25 and hinged hook 24 construction of FIG. 4 may be used. In this embodiment, however, the hinged hooks would not be swung into gripping position until the container and cart are lifted off the ground.

FIG. 11 illustrates one of the other embodiments, for example, that of FIG. 1 in which the rear wheels 10 of the cart 1 are carried on the lower extremity of frame 11 and, of course, as frame 11 is forced backwardly, the wheel 10 is lifted upwardly to clear the ground. A corresponding wheel would be carried on the opposite side of the cart 1.

FIG. 12 is an illustration of lower coupling means which is comprised of the couple 30 (of FIG. 10, but turned on its side) having eye therethrough to receive coupling bolt 26 which passes through the eyes of coupling 32 located on container 2. If it is desired in, say, the embodiment of FIG. 10 to reduce the suspension point 11a of frame 11 to a small area (which may then be of spherical configuration on its top) and use made of the coupling means of FIG. 12, the cart and container may still be cantilevered into the lifted state represented in FIG. 3, coupled by driving home bolt 34, release made of connecting rod 16 and then the cart is ready for mobility. In this embodiment cart 6 is then permitted angulation about a vertical axis 27, FIG. 10, relative to container 2. Although such embodiment is not so stable nor strongly braced, it would permit smaller turning radii for the moving van. It is noted in this embodiment that the cart and container, as in other embodiments, are permitted to have substantially no relative motion with respect to each other about a horizontal axis (whose end projection is seen at 28) disposed between the cart and container. It is understood, in particular embodiments, spring mounts, shocks, or flexible structure may allow limited amounts of freedom, utilizing however the inventive concept taught herein.

For example, it may be seen that in FIGS. 9 or 10 no overhang 2a is necessary if friction or some other means is utilized to prevent the cart and container from sliding with relation to each other. As an example, a friction surface on the plate, or frame 11 and a corresponding engaging friction surface on the container 2 may be enough to prevent relative sliding as the cart and container are being cantilevered up to a position off the ground or as the container is being towed. As a matter of fact, if connecting rod 16 and the attachment of motor 15 to the cart are of sufficient strength, they may, of themselves prevent any sliding between element 11 and container 2.

It may be, therefore, understood that other means may be used than those shown herein for lifting, or cantilevering, the rear of the cart and forward portion of the container from the ground. The basic concept herein is such idea. The specific illustrations are modes of carrying out the invention.

Although the invention has been described and illustrated in detail, it is to be clearly understood that the same is by way of illustration only and is not to be taken as a limitation, the spirit and scope of this invention being limited only by the terms of the appended claims.

I claim:
1. A moving van comprising a container portion having rearwardly disposed rolling means upon which said container portion is adapted to be moved, a cart having forwardly disposed, directable rolling means and rearwardly disposed rolling means, upon which said cart is adapted to move, a rearward frame disposed on said cart, means disposed on said cart for firmly holding said container portion, said frame extending upwardly, means for forcing the upper portion of said frame rearwardly relative to said cart, when said container portion is engaged, whereby the rearward portion of said cart and the forward portion of said container portion are lifted and carried clear of the ground.

2. A moving van comprising a container portion having rearwardly disposed rolling means upon which said container portion is adapted to be moved, a cart having forwardly disposed, directable rolling means and rearwardly disposed rolling means upon which said cart is adapted to move, means disposed rearwardly on said cart for firmly engaging said container portion forwardly and near its lower portion, and means for forcing the upper portion of said container portion rearwardly relative to the lower portion of said container whereby said cart and said container portion are lifted to ride on the forward rolling means of said cart and the rolling means of said container portion and the rearward rolling means of said cart is lifted free of the ground.

3. A moving van comprising a container portion, having a front and a rearward portion, rolling means located rearwardly on said container portion, a cart, said cart having at least one rolling means directable to turn said cart, said cart being cooperatively associated with said container portion, said cart having a frame disposed at its rearward portion, means for coupling said cart and said container portion, said coupling means comprising an upper and lower point of contact between said cart and said container, means for moving the lower point of contact forward relative to the upper point of contact whereby the rear of said cart and the front of said container portion are lifted and are riding on said rolling means of said cart and container, wherein said means for moving the lower point of contact forward relative to the upper point of contact comprises means for coupling said cart and container together at said lower point of contact and means for forcing at least a portion of said frame rearwardly and against said container to force the remainder of said cart and said container farther apart at their upper portions.

4. The combination recited in claim 3, wherein said container portion and said cart are disposed to move, when engaged together, on directable rolling means disposed under the forward portion of said cart and rolling means disposed under the rearward portion of said container.

References Cited by the Examiner

UNITED STATES PATENTS

| | | | |
|---|---|---|---|
| 722,262 | 3/1903 | Stone | 180—12 |
| 2,878,884 | 3/1959 | Schreck | 180—13 |
| 2,956,631 | 10/1960 | Ulinski | 180—13 |
| 2,962,105 | 11/1960 | Simbulan | 180—13 |
| 3,074,500 | 1/1963 | Ulinski | 180—13 X |
| 3,207,253 | 9/1965 | Branning | 180—11 |

BENJAMIN HERSH, *Primary Examiner.*

C. C. PARSONS, *Assistant Examiner.*